(12) United States Patent
Yamahata et al.

(10) Patent No.: US 8,898,084 B2
(45) Date of Patent: Nov. 25, 2014

(54) IMAGE FORMATION APPARATUS CAPABLE OF PERSONAL AUTHENTICATION, CONTROL METHOD OF IMAGE FORMATION APPARATUS, AND COMPUTER READABLE MEDIUM HAVING SOFTWARE PROGRAM STORED THEREIN

(75) Inventors: Taketoshi Yamahata, Toyokawa (JP); Katsushi Sukigara, Hoi-gun (JP); Koichi Nagata, Toyohashi (JP); Kana Yamauchi, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1595 days.

(21) Appl. No.: 11/938,860

(22) Filed: Nov. 13, 2007

(65) Prior Publication Data

US 2009/0024531 A1    Jan. 22, 2009

(30) Foreign Application Priority Data

Jul. 17, 2007   (JP) ................... 2007-185496

(51) Int. Cl.
*G06Q 99/00* (2006.01)
*G06F 21/60* (2013.01)
*G06F 21/31* (2013.01)
*G06F 21/62* (2013.01)

(52) U.S. Cl.
CPC .......... *G06F 21/608* (2013.01); *G06Q 2220/12* (2013.01); *G06F 21/31* (2013.01); *G06F 21/629* (2013.01); *G06F 2221/2135* (2013.01); *G06F 2221/2137* (2013.01); *G06F 2221/2141* (2013.01)
USPC ............... 705/51; 705/55; 358/1.14

(58) Field of Classification Search
USPC ..................... 705/51, 55; 358/1.14
See application file for complete search history.

(56) References Cited

U.S. PATENT DOCUMENTS

| | | | |
|---|---|---|---|
| 6,606,606 B2 * | 8/2003 | Starr ........................... | 705/36 R |
| 7,117,529 B1 * | 10/2006 | O'Donnell et al. ............... | 726/6 |
| 7,359,076 B2 * | 4/2008 | Uchino ......................... | 358/1.15 |
| 2007/0283157 A1 * | 12/2007 | Yami et al. .................... | 713/175 |

FOREIGN PATENT DOCUMENTS

| | | |
|---|---|---|
| JP | 2002-109172 A | 4/2002 |
| JP | 2005-012251 | 1/2005 |
| JP | 2006-235757 | 9/2006 |

OTHER PUBLICATIONS

Ogura (Machine translation of download from Japanese Patent Office Patent & Utility Gazette, downloaded and translated from http://www4.ipdl.inpitgo.jp/Tokujitu/tjsogodbenk.ipd1[Feb. 26, 2014 9:05:25 AM], 21 pages).*
English translation for Japanese Patent Publication JP2006235757, listing Ogura as the inventor, downloaded from http://translationportal.epo.org/...ogle&FORMAT=docdb&KIND=A&LOCALE=en_EP&NUMBER=2006235757&OPS=jp.espacenet.com/ops&SRCLANG=ja&TRGLANG=en [Feb. 26, 2014 8:58:18 PM], 12 pages from European Esp@cenet.*
Notice of Grounds of Rejection issued in JP 2007-185496 dated Aug. 18, 2009, and an English Translation thereof.

* cited by examiner

*Primary Examiner* — James D Nigh
(74) *Attorney, Agent, or Firm* — Buchanan Ingersoll & Rooney PC

(57) ABSTRACT

A general user given beforehand a proxy right by an administrator is allowed to register a special user having the right to use an apparatus in a range of the function right equal to that of himself by operating a special user setting window.

14 Claims, 14 Drawing Sheets

FIG.7

| No | ID | PASSWORD | FUNCTION RESTRICTION | | | | | SPECIAL USER PROXY AUTHORIZATION RIGHT |
|---|---|---|---|---|---|---|---|---|
| | | | COPY | PRINT | SCAN | FAX | BOX | |
| 0 | suzuki | abcdefgh | YES | YES | YES | YES | YES | YES |
| 1 | kimura | 12345678 | YES | YES | YES | NO | YES | YES |
| 2 | yoshida | qwertyui | YES | YES | NO | NO | YES | NO |
| 3 | watanabe | zxcvbnm, | YES | YES | NO | NO | NO | NO |
| .. | .. | .. | .. | .. | .. | .. | .. | .. |

FIG.8

| No | ID | PASSWORD | FUNCTION RESTRICTION | | | | AUTHORIZER | REGISTRATION YEAR/ MONTH/ DATE | EXPIRATION PERIOD TYPE 1:Job 2:day 3:y/m/d | EXPIRATION PERIOD |
| --- | --- | --- | --- | --- | --- | --- | --- | --- | --- | --- |
| | | | COPY | PRINT | SCAN | FAX | BOX | | | |
| 0 | guest1 | poiuytre | YES | YES | YES | NO | YES | kimura | 070329 | 2 | 5 |
| 1 | | | | | | | | | | | |
| 2 | | | | | | | | | | | |
| 3 | | | | | | | | | | | |
| .. | .. | .. | .. | .. | .. | .. | .. | .. | .. | .. |

FIG.9

| OPERATION LOG TYPE | RESULT CODE | IMPLEMENTATION DATE AND TIME | OPERATOR INFORMATION | JOB NUMBER | USER ID | ISSUED ID | ISSUED PASSWORD | AUTHORIZER NAME |
|---|---|---|---|---|---|---|---|---|
| AUTHENTICATE SPECIAL USER PROXY AUTHORIZATION | OK | 2007/3/29 10:12:36 | 0001 | – | kimura | – | – | – |
| SPECIAL USER PROXY AUTHORIZER ISSUES SPECIAL USER ID/ PASSWORD FOR ANOTHER USER | OK | 2007/3/29 10:13:51 | 0001 | – | kimura | guest1 | poiuytre | – |
| USER AUTHENTICATION | OK | 2007/3/29 10:20:01 | 1000 | – | guest1 | – | – | kimura |
| EXECUTE JOB BY COPY FUNCTION | OK | 2007/3/29 10:24:44 | 1000 | 1 | guest1 | – | – | kimura |
| USER AUTHENTICATION | OK | 2007/3/29 11:10:05 | 0002 | – | yoshida | – | – | – |
| EXECUTE JOB BY PRINT FUNCTION | OK | 2007/3/29 10:11:50 | 0002 | 2 | yoshida | – | – | – |
| USER AUTHENTICATION | OK | 2007/3/29 15:28:28 | 1000 | – | guest1 | – | – | kimura |
| EXECUTE JOB BY SCAN FUNCTION | OK | 2007/3/29 17:19:34 | 1000 | 3 | guest1 | – | – | kimura |
| ·· | ·· | ·· | ·· | ·· | ·· | ·· | ·· | ·· |

IMAGE FORMATION APPARATUS CAPABLE OF PERSONAL AUTHENTICATION, CONTROL METHOD OF IMAGE FORMATION APPARATUS, AND COMPUTER READABLE MEDIUM HAVING SOFTWARE PROGRAM STORED THEREIN

This application is based on Japanese Patent Application No. 2007-185496 filed with the Japan Patent Office on Jul. 17, 2007, the entire content of which is hereby incorporated by reference.

BACKGROUND OF THE INVENTION

1. Field of the Invention

The present invention relates to an image formation apparatus capable of personal authentication, a control method of an image formation apparatus, and a computer readable medium having a software program stored therein, and relates to an authentication technique for permitting use of an image formation function.

2. Description of the Related Art

Some of image formation apparatuses such as copiers, printers, scanners, facsimile machines, and MFP (Multi Function Peripheral) which is a combination of these include a personal authentication function for preventing information leakage resulting from unauthorized use.

According to image formation apparatuses of this kind with the personal authentication function, for example, only an administrator and general users individually registered by the administrator are permitted to use the image formation apparatus. This prevents information leakage resulting from unauthorized use.

However, in the absence of an administrator, inconvenience may be caused in use of the apparatus. For this problem, Japanese Laid-Open Patent Publication No. 2002-109172 discloses that, in the absence of an administrator who administers a computer system, one of users is granted a proxy right as an administrator by obtaining approval of a plurality of users.

However, it takes much time and trouble to obtain approval by a plurality of users, thereby complicating the application process for proxy right. In addition, if a proxy user is given full power of the administrator, security concern arises. Moreover, it is not preferable in terms of security that the proxy right which is exceptionally given because of the absence of an administrator is reserved for an indefinite time.

SUMMARY OF THE INVENTION

The present invention is made to solve such problems. An object of the present invention is to provide an image formation apparatus capable of permitting an unregistered user to temporarily use an image formation function even in the absence of an administrator without diminishing security as much as possible, a control method of an image formation apparatus, and a computer readable medium having a software program stored therein.

In accordance with an aspect of the present invention, an image formation apparatus includes an acceptance portion, an authentication portion, a storage portion, a special user setting permission portion, a special user registration portion, an activation portion, and an invalidation portion.

The acceptance portion accepts an input of authentication information for personal authentication. The authentication portion performs personal authentication based on the authentication information accepted by the acceptance portion. The storage portion stores first right information of each of general users. The special user setting permission portion permits, when the authentication portion authenticates one of the general users, initiation of a special user setting process for setting second right information for a special user different from the general user whose first right information is already stored in the storage portion. The special user registration portion registers, when the special user setting process is initiated, the second right information of the special user in the storage portion, within a range of the right information corresponding to the general user authenticated by the authentication portion when receiving the permission of initiation of the special user setting process. The activation portion activates, when the authentication portion authenticates the special user, an image formation function according to the second right information of the special user. The invalidation portion invalidates the second right information of the special user registered in the storage portion in response to satisfaction of a predetermined invalidation condition.

Preferably, the special user registration portion registers an image formation function selected by an operator in the storage portion as the second right information of the special user.

Preferably, the image formation apparatus further includes a general user setting permission portion and a general user registration portion. The general user setting permission portion permits, when the authentication portion authenticates an administrator, initiation of a general user setting process for setting first right information of a general user. The general user registration portion registers, when the general user setting process is initiated, information indicating whether a special right to set the second right information of the special user is granted or not and function information indicating an image formation function of which use right can be given to the special user, as the first right information of the general user, in the storage portion.

Preferably, the image formation apparatus further includes a special right determination portion. The special right determination portion determines whether the general user has a special right to set the second right information of the special user or not, based on the first right information of the general user stored in the storage portion. The special user setting permission portion permits initiation of the special user setting process, when it is determined by the special right determination portion that the general user authenticated by the authentication portion has the special right.

Preferably, when the special user setting process is initiated for the special user registered in the storage portion, the special user registration portion additionally registers the second right information of the special user in the storage portion, within a range of the first right information corresponding to the general user authenticated by the authentication portion when receiving the permission of initiation of the special user setting process this time.

Preferably, the invalidation condition is collectively set for all the special users.

Preferably, the predetermined invalidation condition is set separately for each special user as the second right information of the special user, in the special user setting process.

Preferably, the predetermined invalidation condition is that the number of times the image formation function is used reaches a predetermined number in a state in which the image formation function according to the second right information of the special user is activated by the activation portion.

Preferably, the predetermined invalidation condition is that a particular date has come or that a predetermined number of days have passed since the second right information of the special user was set.

Preferably, the image formation apparatus further includes an invalidation condition setting portion setting the predetermined invalidation condition from among predetermined different kinds.

Preferably, the image formation apparatus further includes an operation history recording portion. The operation history recording portion records an operation history of the image formation apparatus by the special user. Furthermore, the operation history recording portion records information indicating the general user who has set the second right information of the special user together when recording the operation history.

Preferably, the image formation apparatus further includes a setting history recording portion. The setting history recording portion records a setting history at a time of setting the second right information of the special user.

In accordance with another aspect of the present invention, a control method of an image formation apparatus includes the steps of: accepting an input of authentication information for personal authentication; performing personal authentication, based on the authentication information accepted in the step of accepting the input of authentication information; permitting initiation of a special user setting process for setting second right information for a special user different from a general user whose first right information is already set, when general user is authenticated in the step of performing personal authentication; when the special user setting process is initiated, registering the second right information of the special user within a range of the first right information corresponding to the general user authenticated in the step of performing personal authentication when receiving the permission of initiation of the special user setting process; when the special user is authenticated in the step of performing personal authentication, activating an image formation function according to the second right information of the special user; and invalidating the second right information of the special user in response to satisfaction of a predetermined invalidation condition.

In accordance with a further aspect of the present invention, a computer readable medium has a software program stored therein. The software program is installed in an image formation apparatus including a processor to cause the processor to execute the steps of: accepting an input of authentication information for personal authentication; performing personal authentication, based on the authentication information accepted in the step of accepting the input of authentication information; permitting initiation of a special user setting process for setting second right information of a special user different from a general whose first right information is already set, when the general user is authenticated in step of performing personal authentication; when the special user setting process is initiated, registering the second right information of the special user within a range of the first right information corresponding to the general user authenticated in the step of performing personal authentication when receiving the permission of initiation of the special user setting process; when the special user is authenticated by the step of performing personal authentication, activating an image formation function according to the second right information of the special user, and invalidating the second right information of the special user in response to satisfaction of a predetermined invalidation condition.

According to the present invention, even in the absence of an administrator, a general user can temporarily register an unregistered user as a special user. As a result, according to the present invention, the unregistered user can be permitted to temporarily use an image formation function, without diminishing security as much as possible.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a conceptual diagram of registration data of general users.

FIG. 8 is a conceptual diagram of registration data of special users.

FIG. 9 is a conceptual diagram of operation histories stored by MFP.

DESCRIPTION OF THE PREFERRED EMBODIMENTS

An embodiment of the present invention will be described with reference to the figures.

Figure 1:
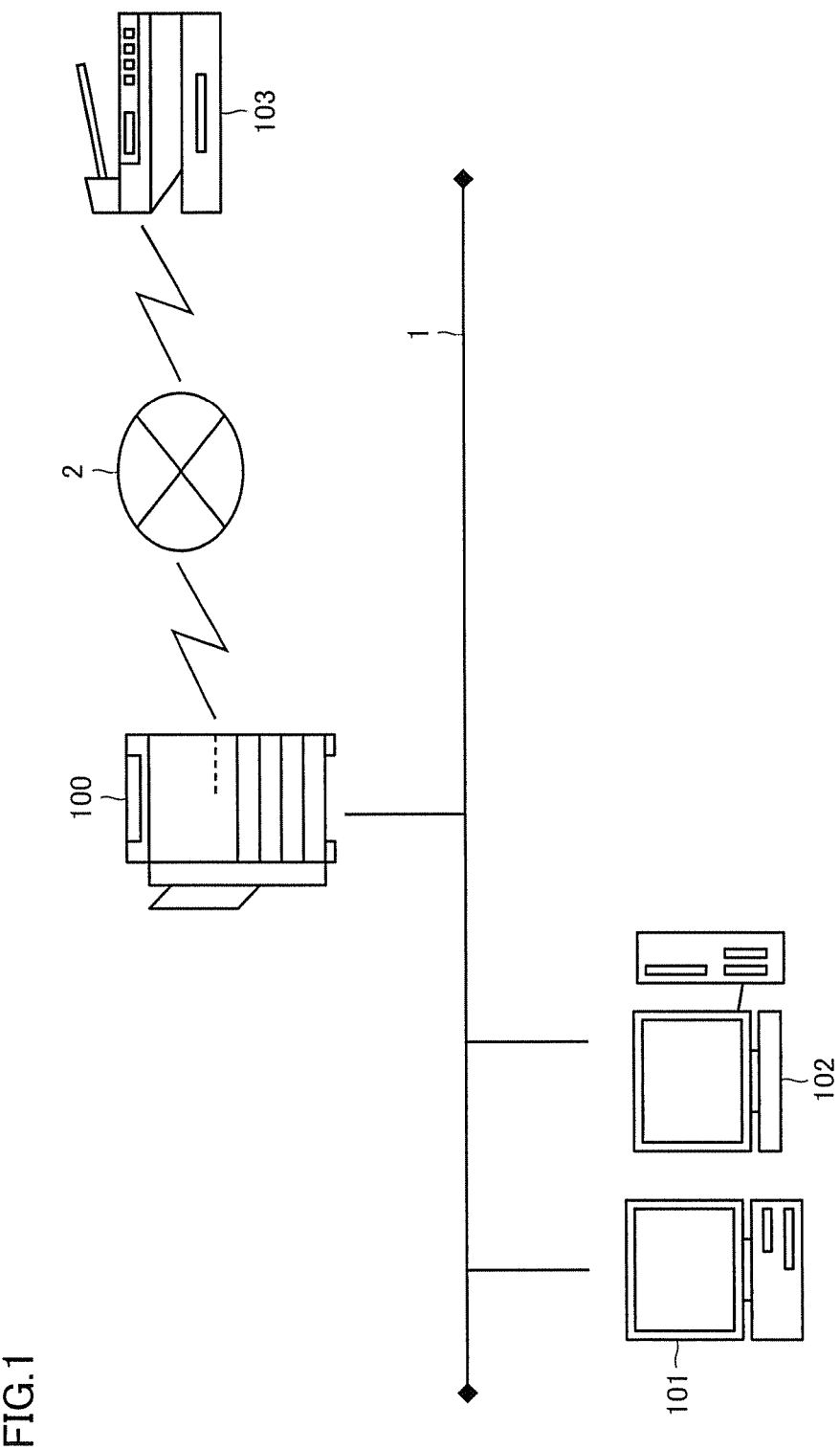
FIG. 1 is a schematic configuration diagram of a system including an image formation apparatus.

FIG. 1 is a schematic configuration diagram of a system including an image formation apparatus in accordance with an embodiment of the present invention. In the present embodiment, MFP is representatively illustrated as an exemplary image formation apparatus in accordance with the present invention. It is noted that the image formation apparatus in accordance with the present invention is not limited to MFP and may be applied to copiers, printers, scanner, facsimile machines, and the like.

Referring to FIG. 1, an MFP 100 has the respective functions of a copier, a printer, a scanner, a facsimile machine, and a box. The box function is a function of saving a variety of scan data and the like for each user in a memory of the main unit. Each user uses the box function to store data that he desires to save in a file region allocated as a personal box.

MFP 100 is connected to a personal computer 101 and a server 102 via a network such as a LAN (Local Area Network) 1. MFP 100 also communicates with a facsimile machine 103 via a public network 2.

MFP 100 transmits a scan job to personal computer 101 or server 102. In addition, MFP 100 prints and outputs on paper an image formed based on a print job received from personal computer 101. Furthermore, MFP 100 transmits a facsimile job to facsimile machine 103 or receives a facsimile job from facsimile machine 103.

Figure 2:
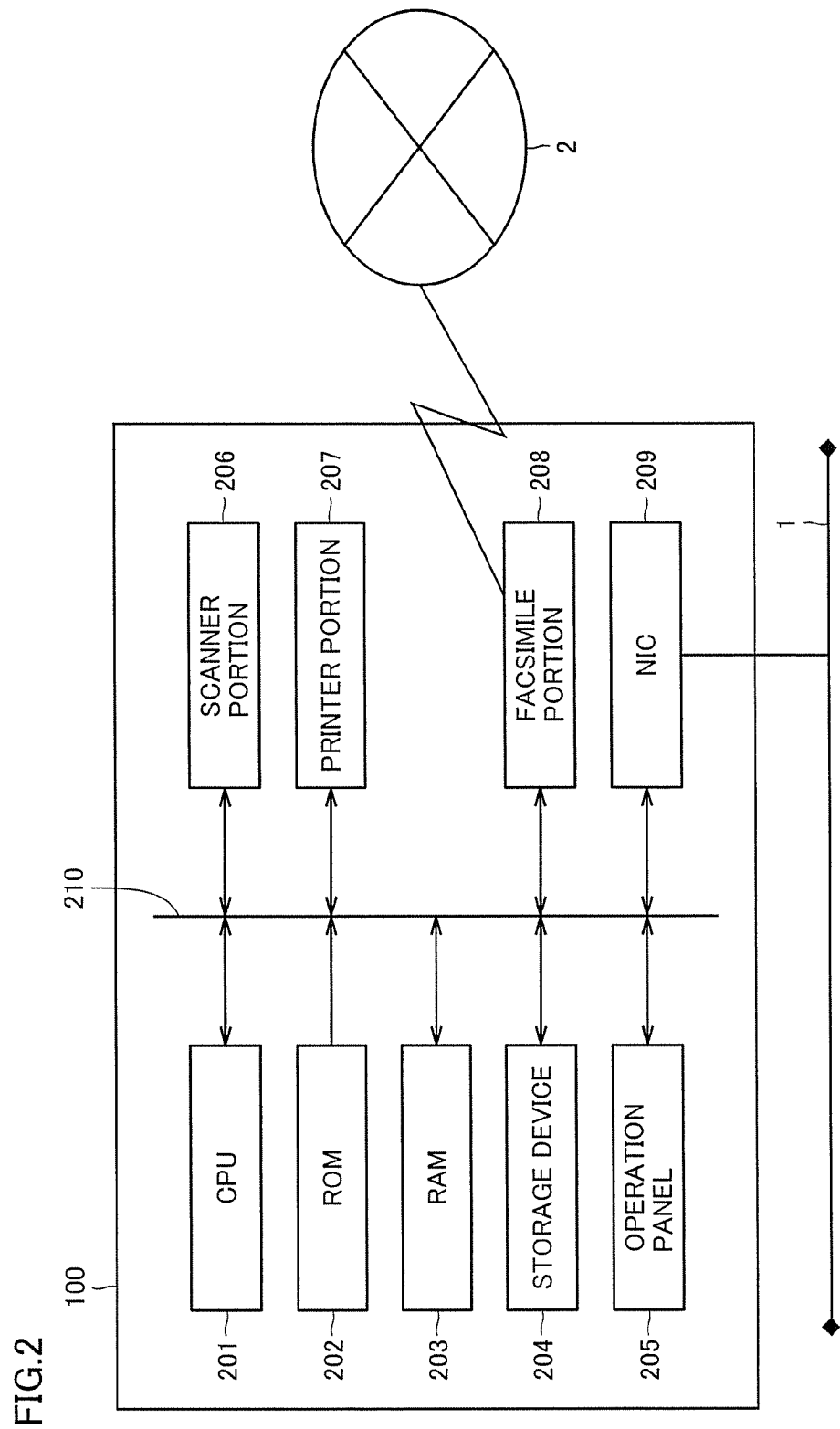
FIG. 2 is a block diagram showing a schematic configuration of MFP.

FIG. 2 is a block diagram showing a schematic configuration of MFP 100. MFP 100 has a CPU (Central Processing Unit) 201, an ROM (Read Only Memory) 202, an RAM (Random Access Memory) 203, a storage device 204, an operation panel 205, a scanner portion 206, a printer portion 207, a facsimile portion 208, and an NIC (Network Interface Card) 209. These components are connected to each other via a bus 210. It is noted that storage device 204 is not necessarily embedded in MFP 100 but may be externally attached to MFP 100.

CPU 201 executes a variety of instructions based on a software program stored in ROM 202 to control each component of MFP 100. Job data transmitted from a work area required to execute the software program or from the outside is temporarily stored in RAM 203. Image data or the like read by scanner portion 206 is also temporarily saved in RAM 203.

Scanner portion 206 reads an original document to create image data. Facsimile portion 208 transmits the image data read by scanner portion 206 to facsimile machine 103 using public network 2. Printer portion 207 converts image data read by scanner portion 206, print data transmitted from personal computer 101 or facsimile data received at facsimile portion 208 into printing data and prints a document or the like based on the converted data.

Operation panel 205 is a liquid crystal display portion having a touch panel on the surface thereof. Operation panel 205 is operated for copying or scanning, copy image quality setting, paper setting, registering recipients of scan data (one-touch registration), selecting recipients of scan data, and the like. In addition, operation panel 205 is operated for user registration and personal authentication of users.

NIC 209 is an interface to connect to LAN 1 for receiving a print job from personal computer 101 and the like or transmitting a scan job to personal computer 101 and the like.

Storage device 204 is, for example, a hard disk drive. Storage device 204 stores a file in a file format such as PDF/TIFF based on image data created by scanner portion 206 or a variety of job data transmitted from an external apparatus such as facsimile machine 103. Storage device 204 also stores information of registered users and operation histories of each user.

Now, a procedure of registering a user by an administrator will be described. The administrator is granted a right to change all settings of MFP 100. This right includes the right to register, change and delete users. By contrast, users other than the administrator are permitted to use MFP 100 with the right in the range registered by the administrator. In the following, a user registered by the administrator will be referred to as a "general user."

It is noted that the number of users who are granted the administrator right may be limited to one or may be more than one in MFP 100. Furthermore, the administrator right may not be a right to enable changes of all the settings of MFP 100. For example, the right to change part of the settings of the setting items of MFP 100 may be granted only to a maintenance person such as a manufacturer of MFP 100. In other words, the administrator right may include at least the right to register a general user.

Users are registered in MFP 100, which are divided into administrators having the administrator right and users not having the administrator right. In addition, a user name and a password are registered for each user in MFP 100. MFP 100 asks a user to enter these two kinds of personal authentication information at the time of personal authentication. Each user operates operation panel 205 to enter each personal authentication information on a log-in window appearing on operation panel 205. MFP 100 determines whether or not a pair of entered personal authentication information agrees with the information registered in MFP 100. If MFP 100 determines that a pair of entered personal authentication information agrees with the information registered in MFP 100, the personal authentication is successful.

If the personal authentication is successful, the user has logged in to MFP 100 in his own right. Therefore, the user is permitted to use MFP 100, for example, within the range of the right of the user who has logged in. Here, the user who finished using MFP 100 performs a log-off operation on a log-off window. Accordingly, MFP 100 enters the state of accepting a log-in operation by a new user.

It is noted that a user can also enter personal authentication information into MFP 100 via a network by operating a keyboard or the like connected to personal computer 101. In this case, if personal authentication is successful, an image formation job transmitted from personal computer 101 is accepted by MFP 100.

In the present embodiment, a pair of a user name and a password is taken as an example of personal authentication information. However, biometric information such as fingerprints may be used.

Figure 3:
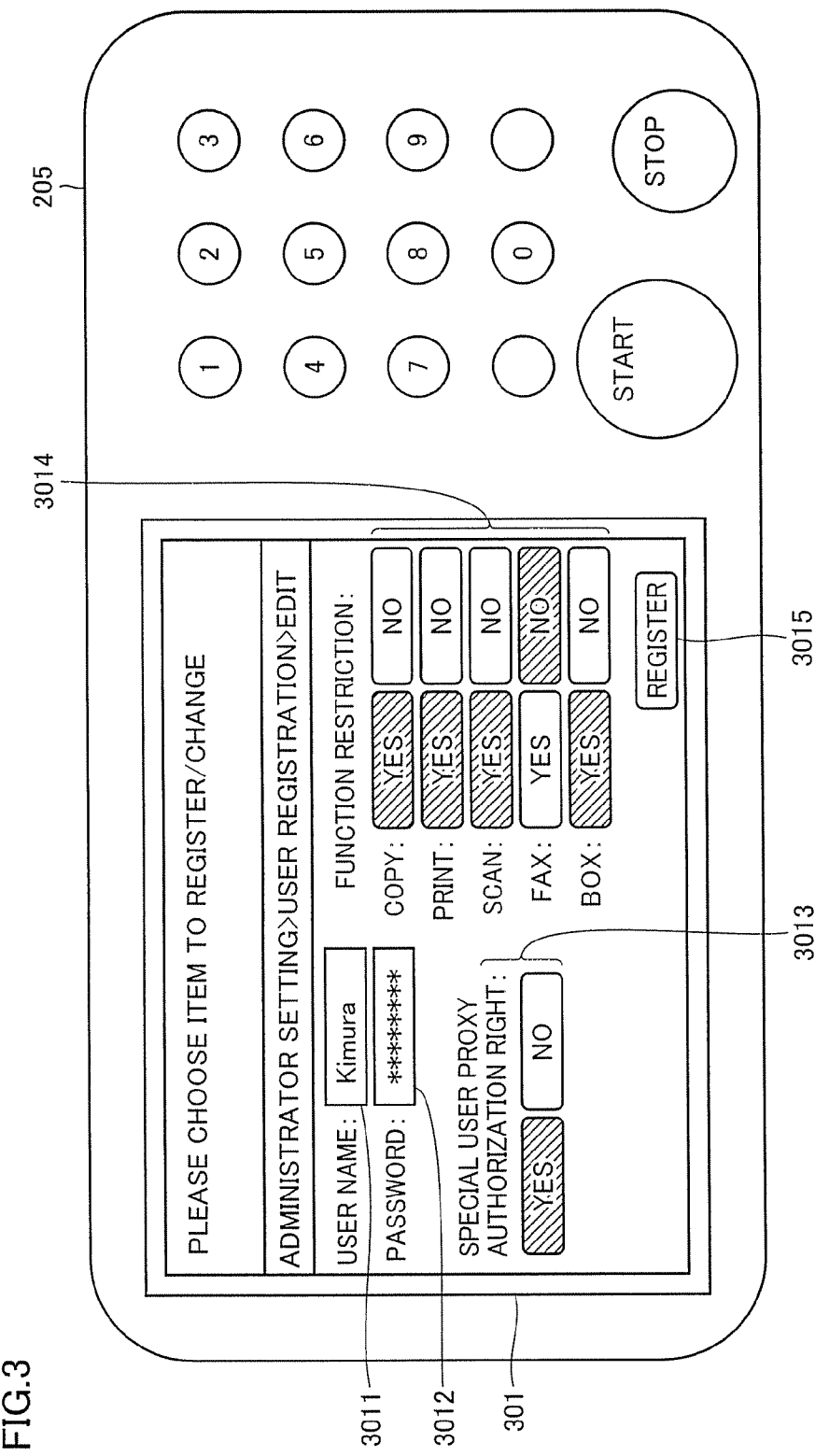
FIG. 3 is a view showing a registration window for an administrator to register a general user.

FIG. 3 is a view showing a registration window 301 for an administrator to register a general user. Registration window 301 appears on operation panel 205 as a result of detection of a prescribed operation on operation panel 205 after authentication of an administrator is successful. In addition, upon appearance of this window, a general user registration process for registering a general user is initiated.

The administrator enters the user name and password of a general user to be newly registered, on registration window 301. For example, in the example in FIG. 3, a general user name "kimura" is input in a user name field 3011. Furthermore, for example, a password in accordance with the general user's own wish is input in a password field 3012. It is noted that this password appears on the window in such a indistinguishable manner as "********."

Here, these alphanumeric characters and the like used for personal authentication information are entered as appropriate by touching on a variety of keys (not shown) displayed on operation panel 205.

As shown in FIG. 3, items of "function restriction" 3014 and items of "special user proxy authorization right" 3013 are displayed on registration window 301. "Function restriction" is an item for setting the range of the use right. For example, in FIG. 3, functions "copy," "print," "scan," "FAX," and "Box" are shown as "use right."

In the items of "function restriction" 3014, "use right granted" or "use right not granted" can be set for each function. "YES" of the items of "function restriction" corresponds to "use right granted" and "NO" corresponds to "use right not granted." When a touch operation for "YES" is detected, "use right granted" is set and the characters are reversely displayed. On the other hand, when a touch operation for "NO" is detected, "use right not granted" is set and the characters are reversely displayed. In the figure, the state of "reverse display" is represented in "shading."

Here, when a touch operation for "NO" is detected in a state in which "YES" has already been reversely displayed, "NO" is reversely displayed and "YES" returns to normal display. Similarly, when a touch operation for "YES" is detected in a state in which "NO" has already been reversely displayed, "YES" is reversely displayed and "NO" returns to normal display. Thus, the setting of the use right is changed.

In FIG. 3, "YES" is reversely displayed for all of the items "function restriction" excluding "FAX." This display shows the setting state in which the use right is permitted for the functions except "FAX."

The item of "special user proxy authorization right" 3013 is an item for setting whether to give the right to approve user registration on behalf of the administrator. In the following, this right will also simply be referred to as "proxy right."

In this embodiment, a user registered by a general user having this proxy right is referred to as a "special user." Of the items of "special user proxy authorization right" 3013, "YES" corresponds to "right granted" and "NO" corresponds to "right not granted."

The procedure of setting operation of "special user proxy authorization right" is similar to the procedure of setting operation of the items of "function restriction" 3014. More specifically, when a touch operation for "YES" is detected, "right granted" is set and the characters are reversely displayed. On the other hand, when a touch operation for "NO" is detected, "right not granted" is set and the characters are reversely displayed.

When a touch operation on a registration button 3015 is detected on registration window 301 after each setting, the settings displayed on registration window 301 are registered in MFP 100. Thus, the registered general user performs a log-in operation to MFP 100 using the given personal authentication information and is allowed to use MFP 100 within the range of the registered right. In particular, the general user who is granted the right to authorize a special user is allowed to register a special user.

Figure 4:
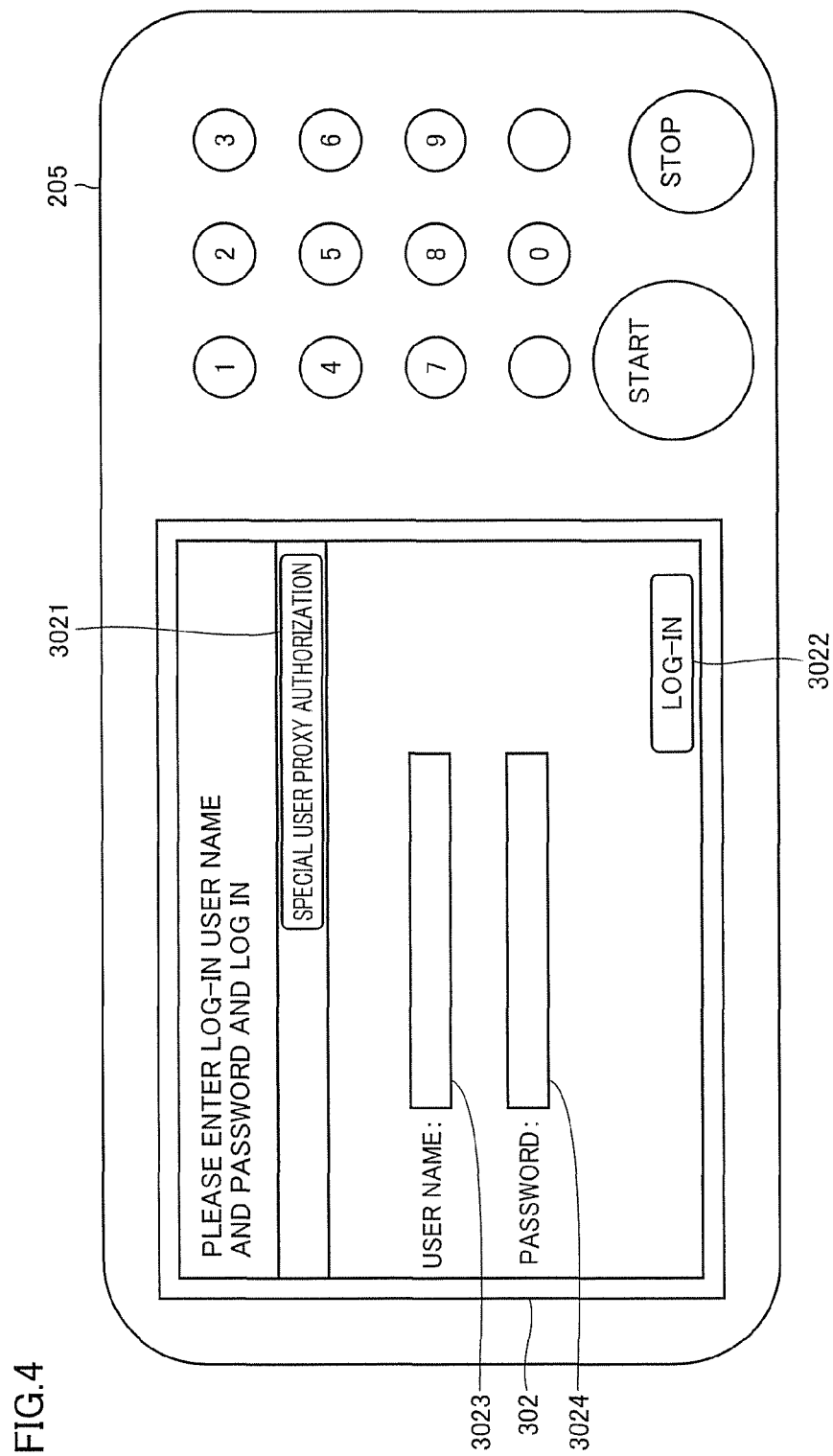
FIG. 4 is a view showing a log-in window for a user to receive personal authentication.

Now, a procedure of registering a special user by a general user will be described. FIG. 4 is a view showing a log-in window 302 for a user to receive personal authentication. On log-in window 302 shown in FIG. 4, an administrator, a general user and a special user enter their own user names and passwords respectively in a user name field 3023 and a password field 3024 and then touch on a log-in button 3022 to receive personal authentication.

Figure 5:
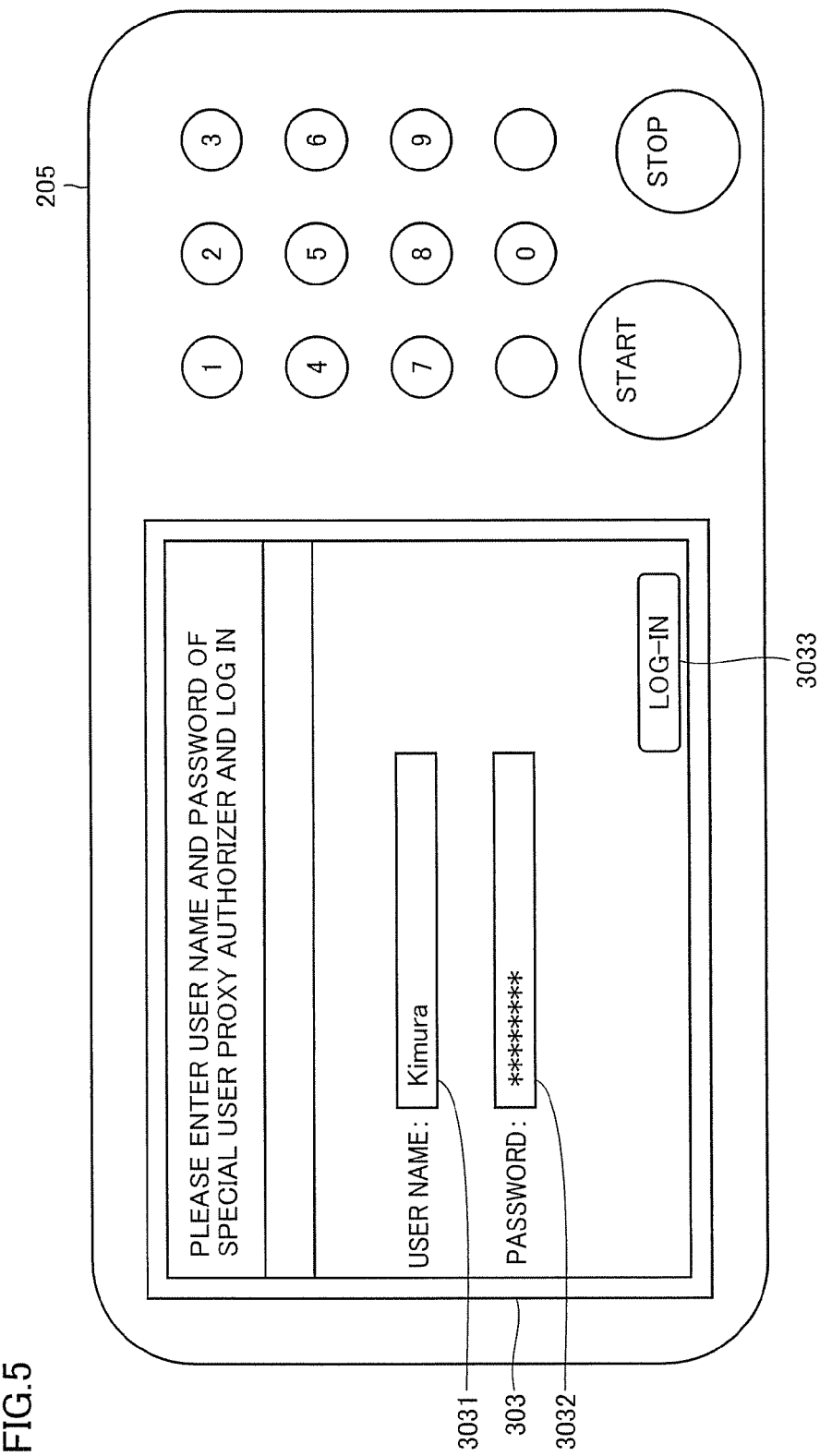
FIG. 5 is a view showing a log-in window for verifying if the user is a general user having a proxy right for registering a special user.

A special user proxy authorization button 3021 is also displayed on log-on window 302. A general user is allowed to set a special user on condition that he touches on special user proxy authorization button 3021. When a touch operation on special user proxy authorization button 3021 is detected, log-in window 302 is switched to a window shown in FIG. 5. FIG. 5 is a view showing a log-in window 303 for verifying if the user is a general user having the proxy right for registering a special user.

A general user enters his own user name and password into a user name field 3031 and a password field 3032 on log-in window 303 in FIG. 5 and then touches on a log-in button 3033 to receive personal authentication. If a general user matched with the entered personal authentication information is not registered, an error window indicating so appears. If a general user matched with the entered personal authentication information is registered but the general user does not have the proxy right, an error window indicating so appears. If a general user matched with the entered personal authentication information is registered and the general user is a general user having the proxy right, the window is switched to a special user registration window 304 shown in FIG. 6.

Figure 6:
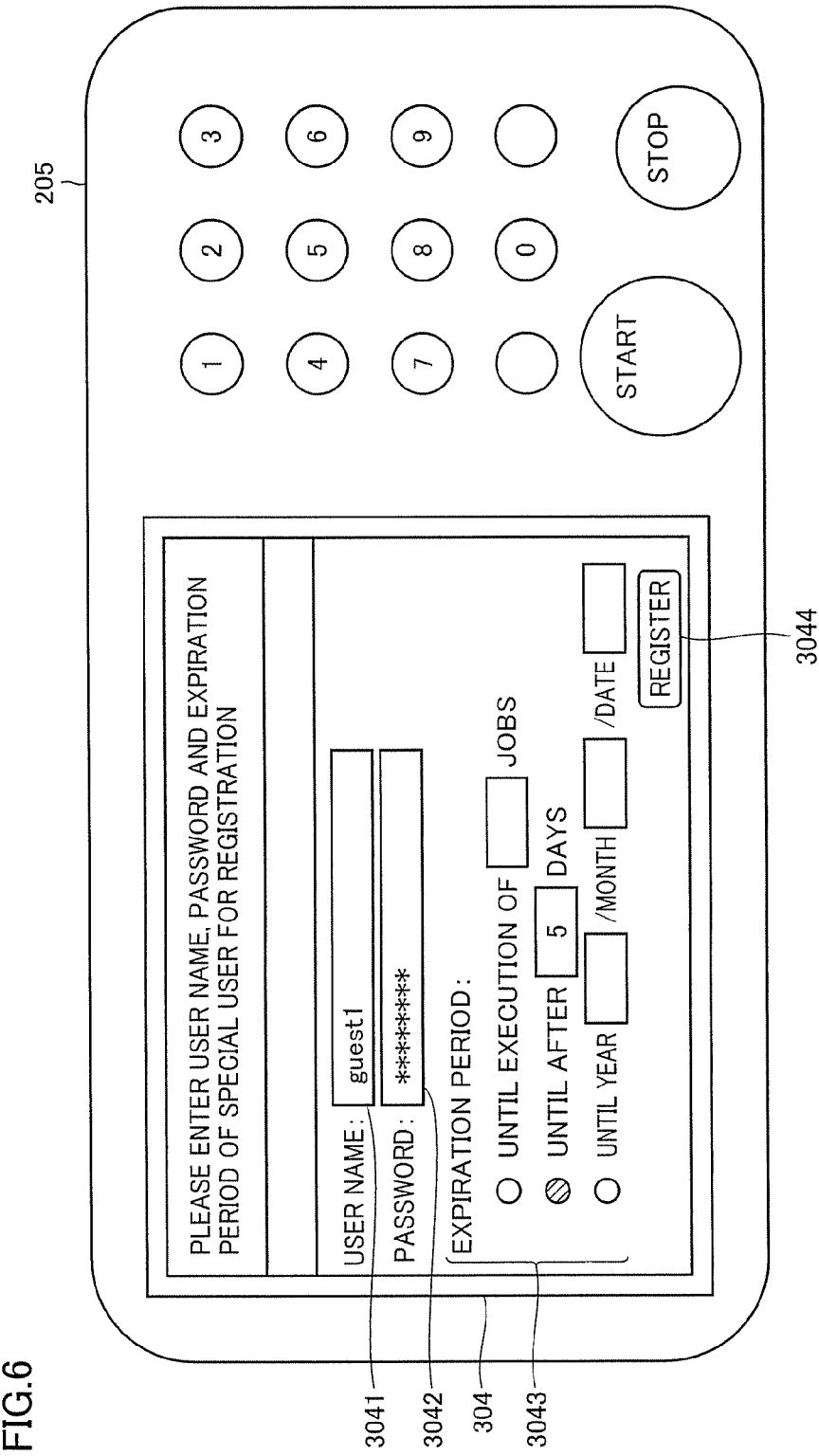
FIG. 6 is a view showing a special user registration window.

In special user registration window 304 shown in FIG. 6, the user name and the password of a newly registered special user are entered in a procedure similar to the registration procedure in general user registration window 301 shown in FIG. 3. For example, in the example in FIG. 6, a special user name "guest 1" is input in a user name field 3041. In addition, for example, the password in accordance with the special user's own wish is input in a password field 3042.

Furthermore, an expiration period field 3043 is displayed on registration window 304. The expiration period of a special user can be set in expiration period field 3043. The type of expiration period can be selected from the number of executed jobs, the number of elapsed days since the registration date, and the designated year, month and date. When the number of executed jobs is selected as a type of expiration period, the number of jobs is entered in the corresponding frame of expiration period field 3043. When the member of elapsed days since the registration date is selected as a type of expiration period, the number of days is entered in the corresponding frame of expiration period field 3043. When the designated year, month and date is designated as a type of expiration period, the year, month and date is entered in the corresponding frame of the expiration period filed 3043. FIG. 6 shows that the number of elapsed days since the registration date is selected as a type of expiration period and a five-day period is designated as the number of days of expiration period.

When a touch operation on a registration button 3044 is detected in the state in which information is input in user name field 3041, password field 3042 and expiration period field 3043, the special user is registered in MFP 100 with the settings displayed on registration window 304. Here, the right of the special user is set equal to the right granted to the general user who has registered the special user. Therefore, the items of "function restriction" 3014 as seen in general user registration window 301 (see FIG. 3) are not displayed on special user registration window 304.

Note that the proxy right concerning registration of a special user is not given to a special user. This prevents a decrease in security due to a sequence of user registrations. However, alternatively, a special user may also be given the proxy right concerning registration of a special user by a selective operation by a general user who registers the special user.

The registered special user performs a log-in operation to MFP 100 using the given personal authentication information and is allowed to use MFP 100 within the range of the registered function right.

Now, registration data of users will be described. Registration data is stored in storage device 204 of MFP 100 separately for general users and special users.

First, registration data of general users will be described. FIG. 7 shows a conceptual diagram of registration data of general users. As conceptually shown in FIG. 7, a password, a restriction status of the function right, whether the right for special user proxy authorization is granted or not are stored for each general user identified by ID, in storage device 204 of MFP 100. In FIG. 7, "YES" indicates that the right is granted and "NO" indicates that the right is not granted. For example, a general user "kimura" corresponding to No. 1 has the function right for copy, print, scan, and box, and does not have the function right for facsimile. Furthermore, "kimura" has the right to authorize a special user as a proxy.

Now, registration data of special users will be described. FIG. 8 is a conceptual diagram of registration data of special users. In FIG. 8, "YES" indicates that the right is granted and "NO" indicates that the right is not granted. As conceptually shown in FIG. 8, a password, a restriction status of the function right, an authorizer, the registration year, month and date, and an expiration period type, and an expiration period are stored for each special user identified by ID, in storage device 204 of MFP 100.

Here, "authorizer" means a general user who has registered a special user. As shown in FIG. 8, the ID of the authorizer is stored as authorizer data. Any one of three numeric values, namely, 1, 2, 3 is stored as "effective period type" data, which are respectively associated with the number of executed jobs, the number of elapsed days since the registration date, and the designated year, month and date. A value of expiration period corresponding to each expiration period type is stored as "expiration period" data.

For example, a special user "guest1" corresponding to No. 1 is registered by the general user "kimura," who is an authorizer, and has the function right registered equal to that of "kimura." The user registration date is Mar. 29, 2007. The expiration period type is "the number of elapsed days since the registration date," and a five-day period is registered as the number of elapsed day.

MFP 100 updates the registration data shown in FIG. 6 and FIG. 7 in response to an operation to register, change, and delete a general user and a special user. In addition, MFP 100 monitors the registration data of special users and automatically deletes the registration data of the special user whose expiration period has elapsed. Thus, the data of the special user temporarily registered because of the absence of the administrator and other reasons can be deleted without involvement of users. Moreover, as a result, cumulative increase in member of special users can be prevented.

Now, operation histories stored by MFP 100 will be described. FIG. 9 is a conceptual diagram of operation histories stored by MFP 100. As shown in FIG. 9, user authentication operations and use histories of each function such as copy, print and scan are stored in MFP 100, together with the implementation date and time, operator information, and user IDs. A history at the time when a special user is newly registered is also stored in MFP 100

For example, a history representing that a general user performs authentication for registering a special user is shown in the first row of the operation log type in FIG. 9. The result code field corresponding to this indicates that the authentication was successful. In addition, the user ID field indicates that the general user who performed the authentication is "kimura." Here, in the four-digit number of the operator information, the first digit indicates a user type and the remaining three digits indicate No. shown in the first column of the registration data shown in FIG. 7 and FIG. 8. Here, in the four-digit number of the operator information, the first digit "1" represents a general user and the first digit "0" represents a special user.

Next, a history representing that an ID and a password are issued for a special user by an authenticated general user is shown in the second row of the operation log type in FIG. 9. In an issued ID field corresponding this, the newly issued ID "guest1" of the special user is shown. In addition, the password for "guest1" is shown in an issued password field.

Next, a history representing that the newly registered special user is successful in authentication is shown in the third row of the operation log type in FIG. 9. In the operator information field corresponding to this history, "1000" corresponding to special user "guest1" who is an operator is shown. In addition, in the authorizer name field corresponding to this history, the ID of the general user who registered the special user "guest1" is shown.

Furthermore, a history representing that a special user is successful in execution of a job of a copy function is shown in the fourth row of the operation log type in FIG. 9. Here, in a job number field corresponding to this history, a job number 1 is shown to represent a copy function. Also in a case where a special user executes a job, the ID of the general user who authorizes that special user is recorded in the authorizer name field.

Thereafter, an operation history is recorded similarly every time each user performs an operation. The operation history recorded in this manner is displayed on operation panel 205 by a prescribed operation in MFP 100. Alternatively, a prescribed command is received from a personal computer connected to MFP 100 so that the operation history is transmitted from MFP 100 to the personal computer.

Note that although the password for "guest1" is shown in FIG. 9, it is desired in terms of security that the display is changed to "*******" or the like so as to be indistinguishable.

Figure 10:
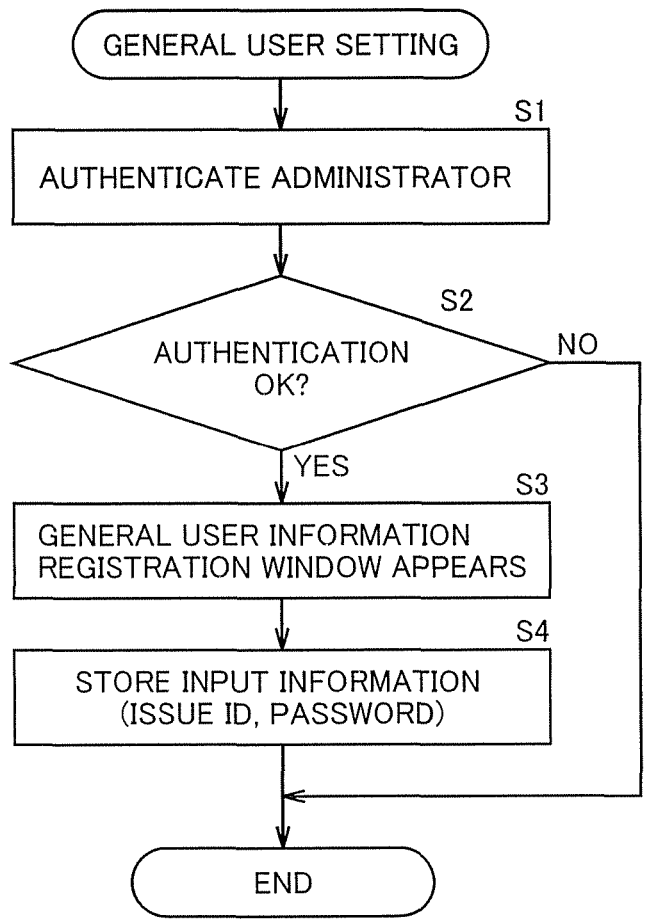
FIG. 10 is a flowchart showing a procedure of a general user setting process.

Now, referring to the flowchart, a process procedure in MFP 100 will be described. First, a general user registration procedure will be described FIG. 10 is a flowchart showing a procedure of a general user setting process.

First, in a case where a person having the administrator right newly registers a general user, MFP 100 performs an administrator authentication (S1). If the administrator authentication is failed, the process ends (NO in S2). If the administrator authentication is successful (YES in S2), MFP 100 displays registration window 301 (see FIG. 3) for registering information of a general user (S3). Then, when a registration operation is detected after a variety of information is input by operations of the operator, MFP 100 stores the input information in the registration data of general users (S4). Accordingly, an ID and a password for a new general user are issued.

Figure 11:
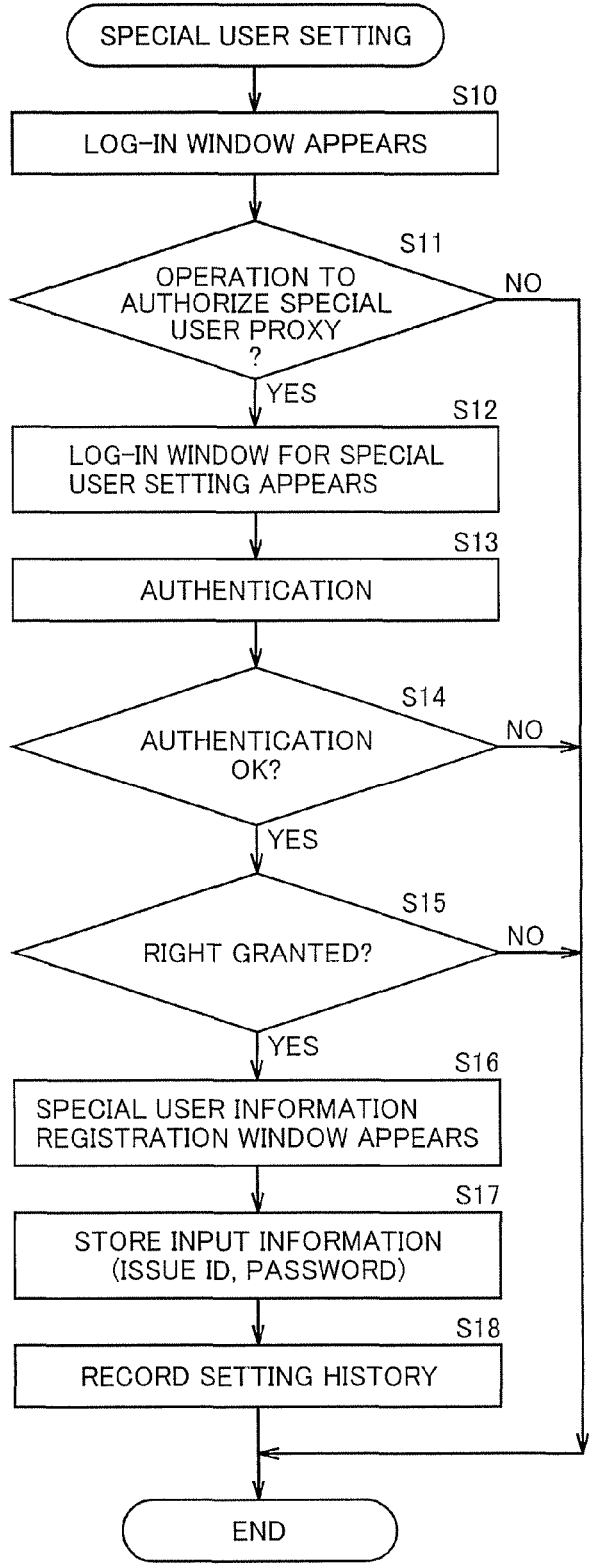
FIG. 11 is a flowchart showing a procedure of a special user setting process.

Now, a special user registration procedure will be described. FIG. 11 is a flowchart showing a procedure of a special user setting process. First, MFP 100 displays log-in window 302 (see FIG. 4) (S10). Next, MFP 100 determines whether or not an operation of special user proxy authorization is detected (S11). When a touch operation on special user proxy authorization button 3021 (see FIG. 4) is detected, YES is determined in S11. Then, MFP 100 displays log-in window 303 (see FIG. 5) for setting a special user (S12).

Next, MFP 100 executes an authentication process based on the input ID and password (S13). Specifically, MFP 100 compares the input ID and password with the stored registration data (see FIG. 7). Then, when the data matched with the input ID and password is included in the registration data, MFP 100 determines that the authentication is successful (S14). In this case, MFP 100 determines whether or not the user is a general user having the proxy right concerning registration of a special user, based on the registration data (S15).

When it is determined in S15 that the user is not a general user having the proxy right concerning registration of a special user, the process ends. When it is determined that the user is a general user having the proxy right, MFP 100 displays registration window 304 (see FIG. 6) for registering information of a special user (S16). Then, when a registration operation is detected after a variety of information is input through operations by the operator, the input information is stored in the registration data of special users (S17). Accordingly, an ID and a password for a new general user are issued. In addition, MFP 100 stores a setting history corresponding to that a special user is newly set (S18). Thus, the operation histories, for example, in the first row and the second row shown in FIG. 9 are stored.

Figure 12:
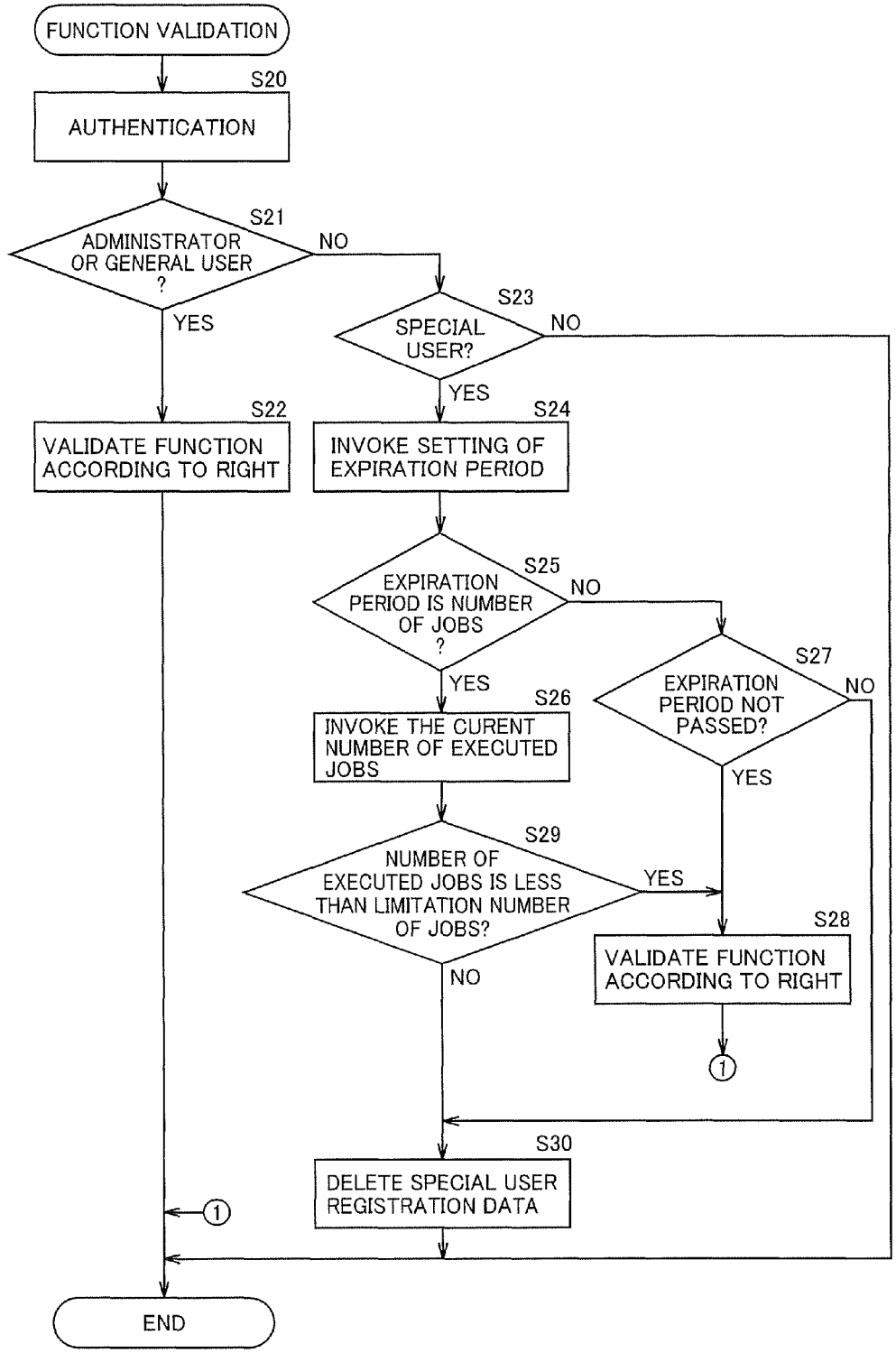
FIG. 12 is a flowchart showing a procedure of a function validating process.

Next, a procedure for validating a function of MFP 100 will be described. FIG. 12 is a flowchart showing a procedure of a function validation process. First, MFP 100 executes an authentication process based on the ID and password entered on the log-in window and the user registration data (S20).

Next, when an administrator or a general user is authenticated as a result of the authentication process (YES in S21), MFP 100 validates the function according to the right stored in registration data corresponding to the authenticated user (S22). By contrast, when a special user is authenticated as a result of the authentication process in S20 (YES in S23), MFP 100 invokes the setting of the expiration period corresponding to the authenticated special user from storage device 204 (S24). Thus, MFP 100 refers to the expiration period type of the registration data shown in FIG. 8.

Next, MFP 100 determines whether the expiration period type is the number of jobs or not (S25). When the expiration period type is not the number of jobs, MFP 100 determines whether the expiration date has not passed (S27). Then, if the expiration date has passed, MFP 100 deletes the registration data of the special user (S30). As a result, the use of MFP 100 by the special user is prohibited. On the other hand, if the expiration date has not passed, MFP 100 validates the function according to the right stored in the registration data (S28).

If the expiration period type is the number of jobs (YES in S25), MFP 100 invokes the current number of executed jobs from storage device 204 (S26). Then, MFP 100 determines whether or not the number of executed jobs is less than the limitation number of jobs defined by the expiration period (S29). If the number of executed jobs is less than the limitation number of jobs, MFP 100 validates the function according to the right stored in the registration data (S28). Thereafter, MFP 100 increments the number of executed jobs every time a job is executed by the special user. Then, MFP 100 prohibits the special user from using MFP 100 when the number of executed jobs reaches the number of jobs defined by the expiration period.

Here, MFP 100 may automatically delete the registration data of the special user at this timing. If it is determined in S29 that the number of executed jobs is equal to or more than the limitation number of jobs, MFP 100 deletes the registration data of the special user (S30). As a result, the use of MFP 100 by the special user is prohibited.

If it is determined that the user is none of an administrator, a general user and a special user, as a result of authentication in S20 (NO in S21 and S23), the process ends without validating any of the functions of MFP 100. It is noted that the case when MFP 100 determines NO in S23 includes a case where the special user whose registration is deleted after a lapse of the preset expiration period performs an authentication operation.

According to the present embodiment as described above, a general user other than an administrator can newly register a user using the right on behalf of the administrator. Therefore, even in the absence of the administrator, an unregistered person who needs to use MFP 100 is given the right as a special user and is allowed to use MFP 100.

It is noted that, in the present embodiment, all general users do not always register a special user, and the proxy right is granted only to particular general users selected beforehand by the administrator. Therefore, a special user can be generated in the range expected by the administrator.

In addition, the registration data of a special user is automatically deleted upon expiration of the predetermined expiration period, so that the use of MFP 100 by a special user can be limited in a temporary range. As a result, security can be assured. Moreover, the deletion does not require a determination by the administrator or the like as to whether to preserve a special user, thereby reducing administration costs.

In addition, in the present embodiment, the range of the right given to a special user is limited to the range of the general user's right. This prevents a special user from using MFP 100 in a manner exceeding the right of the general user who authorizes him.

Moreover, in the present embodiment, the history in registering a special user is recorded, so that when, who and what procedure the special user has been registered can be grasped.

Furthermore, when a special user uses MFP 100, the operation history is recorded. Besides, the general user who is the authorizer is also recorded in the operation history. Therefore, if the special user has a malicious intention in the apparatus usage, the responsibility of the user as a proxy authorizer is easily pursued. Thus, a decrease of security caused by allowing a general user to register a special user can be prevented as much as possible.

[First Modification]

Figure 13:
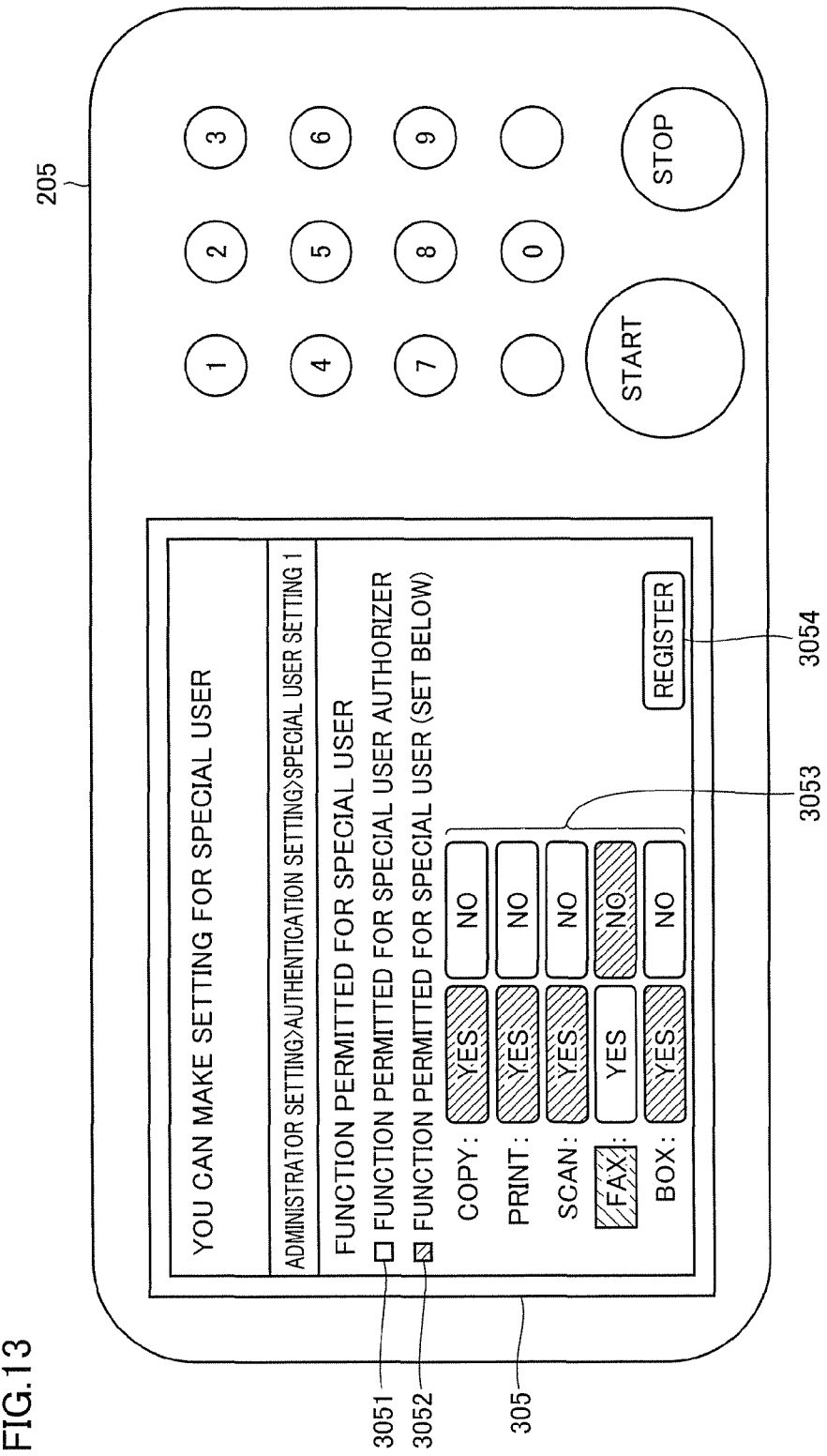
FIG. 13 is a view showing a special user registration window for illustrating a first modification.

Now, a first modification in which a part of the foregoing embodiment is modified will be described. FIG. 13 is a view showing a special user registration window 305 for illustrating the first modification.

In the foregoing embodiment, the function right of a special user is set equal to the function right granted to a general user who has registered the special user. By contrast, in the first modification, the function right of a special user can be set selectively in the range of the function right given to a general user himself. This special user registration window 305 appears, for example, after the ID and password of a special user is registered on a different window.

Special user registration window 305 includes a setting button 3051 for setting the use right of a special user equal to that of a general user himself, and a setting button 3052 for making a choice from the function right given to a general user himself.

The setting corresponding to setting button 3051 is finalized by detection of a touch operation on registration button 3054 after a touch operation on setting button 3051 is detected. On the other hand, when a touch operation on setting button 3052 is detected, the use right can be selected from the items of "function restriction" 3053 in a similar procedure as general user registration window 301 (see FIG. 3). Note that the use right that is not granted to the general user himself who is the authorizer of the special user is reversely displayed (shaded in FIG. 13) beforehand and cannot be selected. When a touch operation on registration button 3054 is detected after the use right is selected from the items of "function restriction" 3053, the special user having the selected use right is registered.

According to the first modification, the use right of a special user can be set within a required minimum range.

[Second Modification]

Figure 14:
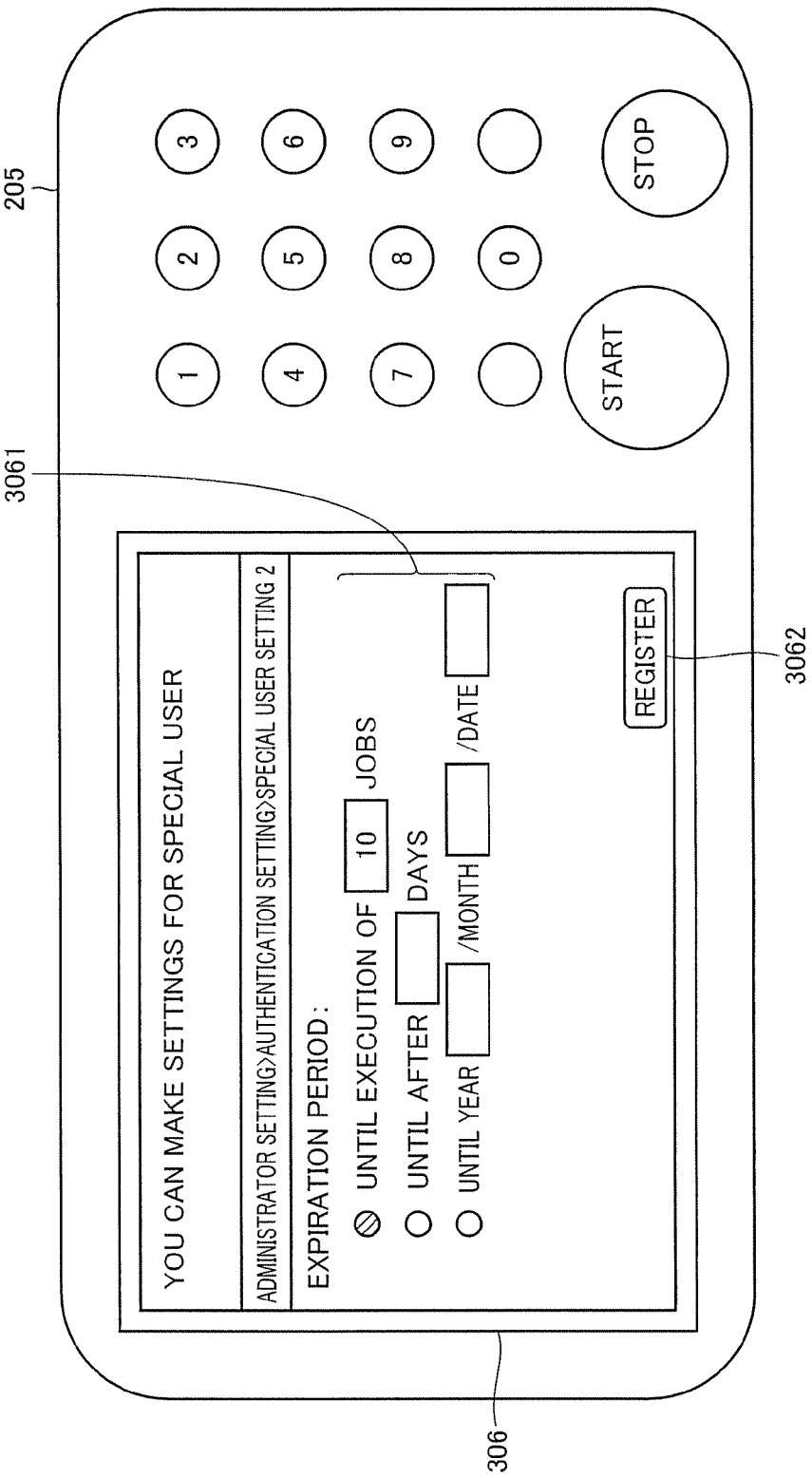
FIG. 14 is a view showing a special user setting window for illustrating a second modification.

Now, a second modification in which a part of the foregoing embodiment is modified will be described. FIG. 14 is a view showing a special user setting window 306 for illustrating the second modification.

In the foregoing embodiment, the expiration period of a special user is set for each special user. By contrast, in the second modification, the expiration period of special users is collectively set by an administrator. Special user setting window 306 is a window appearing when the administrator is successful in authentication and an administrator mode is set. Therefore, this setting window cannot be used by a general user.

As shown in FIG. 14, special user setting window 306 includes an expiration period field 3061 similar to that of registration window 301 (see FIG. 6). The administrator determines an expiration period type and an expiration period thereof in expiration period field 3061 and touches on a registration button 3062, so that the expiration period of all special users is collectively set.

Therefore, in the case of the second modification, expiration period field 3043 as shown in FIG. 6 does not appear on the registration window for a general user to register a special user. As for the registration data of special users, the expiration period set in special user setting window 306 shown in FIG. 14 is collectively set. According to the second modification, the administrator easily manages the expiration period of special users.

[Third Modification]

In the foregoing embodiment, the use right of a special user is limited to the use right of the general user who has registered the special user. However, the special user may wish to use the restricted use right. The following third modification is therefore proposed.

In special user registration window 304 (see FIG. 6), the ID and password of the special user who has already been registered is entered. This entry is made by a general user having the right to authorize a special user.

Then, the current use right of the special user is displayed on the screen as shown in FIG. 13. For example, in a case where a general user who has registered a special user does not have only the user right of facsimile, as shown in FIG. 13, "NO" is reversely displayed only in the item of facsimile. Here, whether or not a general user who allows the special user registration window to appear this time has the use right of facsimile is determined by MFP 100. Then, when it is determined that he has the use right of facsimile, the use right of facsimile is permitted to be additionally set. In this case, the operator touches on "YES" corresponding to the item of facsimile so that "YES" is switched from "NO" and reversely displayed. Thus, the use right of facsimile is added.

According to the third modification, a further addition can be made to the use right of a special user registered by one general user, within the range of the use right of another general user.

[Fourth Modification]

In the foregoing embodiment, copy, facsimile, print, and the like are taken as examples of units of the use right. However, the units of the use right can be further subdivided. Then, the use right of general users or special users can be limited in detail with the subdivided use right.

For example, "print" may be subdivided into "only monochrome printing permitted," and "color printing permitted." For example, "facsimile transmission" or "scan data transmission" may be subdivided into "only internal transmission permitted," "external transmission also permitted," "only domestic transmission permitted," "overseas transmission permitted," and the like.

It is noted that, in modifying the foregoing embodiment, only any one of the first to fourth modifications may be incorporated or all the modifications may be incorporated. Alternatively, of the first to fourth modifications, any given number of modifications may be incorporated.

In the following, other modifications are listed.

The right to delete registration data of special users may be given to a general user having the right of special user proxy authorization.

The registration data of users shown in FIG. 7, FIG. 8 and the operation history data shown in FIG. 9 may be stored in a memory removable from MFP 100. Alternatively, these data may be stored in a memory of a computer connected to MFP 100.

In the foregoing embodiment, the operations such as registration/change of each user are performed on the screen of MFP 100. However, a variety of settings as described above may be made by operating a computer connected to MFP 100.

In the foregoing embodiment, the right information of a special user is invalidated by deleting the registration information of the special user whose expiration period has elapsed. However, the registration information of the special user whose expiration period has passed may not be deleted and may be moved to and stored in a prescribed invalid user storage region. Then, the user stored in the invalid user storage region is prohibited from using MFP 100 so that the registration information of the special user whose expiration period has passed is invalidated. Here, the invalid user storage region may be provided in storage device 204 storing user registration data or may be provided in another storage medium connected to MFP 100.

Furthermore, a software program may be provided which causes a computer functioning as an image formation apparatus to execute the processing shown in FIG. 10-FIG. 12. Such a software program may be stored in a computer readable storage medium to be attached to a computer, such as a flexible disk, a CD-ROM (Compact Disk-Read Only Memory), an ROM, an RAM and a memory card and then provided as a program product. Alternatively, the software program may be stored and provided in a storage medium such as a hard disk embedded in a computer. Alternatively, the software program downloaded via a network may be provided.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image formation apparatus comprising:
an operation panel receiving an input of authentication information for personal authentication such that authentication can be verified;
a storage device storing first right information for a plurality of general users;
a general user setting permission portion permitting, when an authentication of an administrator is verified, initiation of a general user setting process for setting first right information of a general user from the plurality of general users;
a general user registration portion registering, when said general user setting process is initiated, (i) information indicating whether a special right to set said second right information of the special user, different from the general user, is granted and (ii) function information indicating a function of which use right can be given to said special user, based on said first right information of said general user, in said storage device;
a special right determination portion determining whether said general user, when authenticated, has a special right to set second right information of a special user, different from the general user, based on said first right information of said general user stored in said storage device;
a processing unit permitting, when (i) said authentication of said general user is verified in said image formation apparatus and (ii) it is determined by said special right determination portion that said authenticated general user has said special right, initiation of a special user setting process for setting said second right information for the special user different from said authenticated general user whose first right information is already stored in said storage device;

a processing unit registering, when said special user setting process is initiated, said second right information of said special user in said storage device separate from said first right information, within a range of said first right information corresponding to said authenticated general user when receiving permission of initiation of the special user setting process from the authenticated general user;

a processing unit allowing, when said authentication of said special user is verified in said image formation apparatus, the use of at least one of a plurality of functions of the image formation apparatus according to said second right information of the special user, wherein said functions include a copy function, a print function, a scan function, a facsimile function, and a box function; and a processing unit invalidating said second right information of said special user registered in said storage device in response to satisfaction of a predetermined invalidation condition.

2. The image formation apparatus according to claim 1, wherein said processing unit registers a function selected by an operator in said storage device as said second right information of said special user.

3. The image formation apparatus according to claim 1, wherein when said special user setting process is initiated for the special user registered in said storage device, said special user registration portion additionally registers said second right information of said special user in said storage device, within a range of said first right information corresponding to the authenticated general user when receiving the permission of initiation of the special user setting process this time.

4. The image formation apparatus according to claim 1, wherein said invalidation condition is collectively set for all said special users.

5. The image formation apparatus according to claim 1, wherein said predetermined invalidation condition is set separately for each special user as said second right information of said special user, in said special user setting process.

6. The image formation apparatus according to claim 1, wherein said predetermined invalidation condition is that the number of times said function of the apparatus is used reaches a predetermined number in a state in which said special user is allowed to use said function according to said second right information of said special user.

7. The image formation apparatus according to claim 1, wherein said predetermined invalidation condition includes one of: a particular date that has come or a predetermined number of days that have passed since said second right information of said special user was set.

8. The image formation apparatus according to claim 1, further comprising an invalidation condition setting portion setting said predetermined invalidation condition from among predetermined different kinds.

9. The image formation apparatus according to claim 1, further comprising an operation history recording portion recording an operation history of said image formation apparatus by said special user, wherein said operation history recording portion records information indicating said general user who has set said second right information of said special user together when recording said operation history.

10. The image formation apparatus according to claim 1, further comprising a setting history recording portion recording a setting history at a time of setting said second right information of said special user.

11. A control method of an image formation apparatus comprising the steps of:

accepting, by an operation panel, an input of authentication information for personal authentication;

performing personal authentication, in said image formation apparatus, based on the authentication information accepted in said step of accepting the input of authentication information;

permitting initiation, in said image formation apparatus, of a general user setting process for setting first right information of a general user, when an administrator is authenticated in said step of performing personal authentication, said general user setting process includes registering (i) information indicating whether a special right to set second right information of a special user, different from the general user, is granted and (ii) function information indicating an image formation function of which use right can be given to said special user, based on said first right information of said general user;

determining, in said image formation apparatus, whether said general user, when authenticated, has a special right to set said second right information of said special user, based on registered said first right information of said general user;

permitting initiation, in said image formation apparatus, of a special user setting process for setting second right information for a special user different from a general user whose first right information is already set, when (i) said general user is authenticated in said step of performing personal authentication and (ii) it is determined by said step of determining that said general user authenticated by said step of performing personal authentication has said special right;

when said special user setting process is initiated, registering said second right information of said special user within a range of said first right information corresponding to said general user authenticated in said step of performing personal authentication when receiving the permission of initiation of the special user setting process;

when said special user is authenticated in said step of performing personal authentication, allowing at least one of a plurality of functions of said image formation apparatus, according to the second right information of the special user, wherein said functions include a copy function, a print function, a scan function, a facsimile function, and a box function; and invalidating, in said image formation apparatus, said second right information of said special user in response to satisfaction of a predetermined invalidation condition.

12. The control method of an image formation apparatus according to claim 11, wherein in said step of registering said second right information of said special user, when said special user setting process is initiated for the registered special user, said second right information of said special user is additionally registered within a range of said first right information corresponding to the general user authenticated in said step of performing personal authentication when receiving the permission of initiation of the special user setting process this time.

13. A non-transitory computer readable medium having a software program stored therein, said software program being installed in an image formation apparatus including a processor to cause the processor to execute the steps of:

accepting an input of authentication information for personal authentication;

performing personal authentication, in said image formation apparatus, based on the authentication information accepted in said step of accepting the input of authentication information;

permitting initiation of a general user setting process for setting first right information of a general user, when an administrator is authenticated in said step of performing personal authentication, said general user setting process includes registering (i) information indicating whether a special right to set second right information of a special user, different from the general user, is granted and (ii) function information indicating an image formation function of which use right can be given to said special user, based said first right information of said general user;

determining whether said general user, when authenticated, has a special right to set said second right information of said special user, based on registered said first right information of said general user;

permitting initiation of a special user setting process for setting second right information of a special user different from a general whose first right information is already set, when (i) said general user is authenticated in said step of performing personal authentication and (ii) it is determined by said step of determining that said general user authenticated by said step of performing personal authentication has said special right;

when said special user setting process is initiated, registering said second right information of said special user within a range of said first right information corresponding to said general user authenticated in said step of performing personal authentication when receiving the permission of initiation of the special user setting process;

when said special user is authenticated in said step of performing personal authentication, allowing at least one of a plurality of functions of said image formation apparatus, according to the second right information of the special user, wherein said functions include a copy function, a print function, a scan function, a facsimile function, and a box function; and invalidating said second right information of said special user in response to satisfaction of a predetermined invalidation condition.

14. The non-transitory computer readable medium having a software program stored therein according to claim 13, wherein in said step of registering said second right information of said special user, when said special user setting process is initiated for the registered special user, said second right information of said special user is additionally registered within a range of said first right information corresponding to the general user authenticated in said step of performing personal authentication when receiving the permission of initiation of the special user setting process this time.

* * * * *